April 19, 1966

L. HUBER 3,246,842

APPARATUS FOR THE PRODUCTION OF HOT GAS
CURRENTS FOR HEATING PURPOSES

Filed Aug. 2, 1963

INVENTOR
LUDWIG HUBER by:
Michael S. Striker
Attorney

April 19, 1966 L. HUBER 3,246,842
APPARATUS FOR THE PRODUCTION OF HOT GAS
CURRENTS FOR HEATING PURPOSES
Filed Aug. 2, 1963 3 Sheets-Sheet 3

INVENTOR.
LUDWIG HUBER
BY
McGlew & Toren
ATTORNEYS.

3,246,842
APPARATUS FOR THE PRODUCTION OF HOT GAS CURRENTS FOR HEATING PURPOSES
Ludwig Huber, Saarlandstrasse 15, Suttgart-Mohringen, Germany
Filed Aug. 2, 1963, Ser. No. 299,673
2 Claims. (Cl. 237—33)

This is a continuation-in-part of my application Serial No. 771,152 filed October 31, 1958, now abandoned.

The present invention relates to apparatus for the production of hot gas currents for heating purposes.

An object of the invention is to provide a device for generating hot gases so combined with a pipe line for the hot gases that it may be detached from the latter and utilized in connection with different pipe lines.

An additional object of the invention is to provide an apparatus for the production of a hot gas stream or current in a closed path which at the same time acts as a heat exchanger or which may be combined with one or more heat exchangers in such manner that the latter receive thermal energy from the hot gases passing therethrough.

A concomitant object of the present invention is to provide an apparatus of the characteristics above set forth which is extremely simple in construction, which may be constructed as a very small and compact unit, and which is capable of a great number of diversified uses as a means for transmitting thermal energy to gaseous or liquid media, as a means for producing flames, as a means for conveying gaseous, liquid or solid fuels, and many other uses.

The above and certain other objects of the present invention are attained by the provision of an apparatus which consists essentially of a pipe line system defining the closed path for a hot gas current and housing a device which will hereinafter be called a resonant or vibrating burner. The latter includes a combustion chamber and an exhaust pipe, these two elements causing the hot gases developing therein to flow into the closed-circuit pipe line and to thus set in motion the gases already contained in the pipe line. The operation of the resonant burner is comparable to that of the so-called Helmholtz' resonator. A combustible mixture is introduced into the combustion chamber to be ignited therein whereby the combustion gases developing in the chamber expel the gases filling the exhaust pipe. The kinetic energy of expelled gases causes the latter to swing or vibrate beyond their position of equilibrium and to generate a vacuum in the combustion chamber. Due to such vacuum, a new supply of fuel, preferably a mixture of liquid fuel with air, is sucked into the combustion chamber and also a certain quantity of expelled gases is drawn from the pipe line back into the resonant burner. Such withdrawn gases or the hot walls of the combustion chamber cause ignition of the newly introduced fuel in the combustion chamber, and the process is thereupon repeated automatically and periodically in the above-described sequence with the innate or characteristic acoustic frequency of the apparatus. It will be seen that the operation of the resonant burner comprises alternating sumatmospheric pressure phases and superatmospheric pressure phases. In each superatmospheric pressure phase, gases developing in the combustion chamber are discharged from the chamber and from the exhaust pipe into the pipe line. In the subatmospheric pressure or vacuum phase, gases in the pipe line are partly drawn back into the resonant burner together with a new supply of combustible material which latter generates additional gases to be thereupon discharged into the pipe line in the subsequent superatmospheric pressure phase. The gases discharged in each superatmospheric pressure phase excite the spent gases already filling the pipe line and cause movements of spent gases in the pipe line in a closed path whereby at least a portion of spent gases is returned into contact with the resonant burner.

The gases which are periodically ejected or discharged from the exhaust pipe may be utilized as heat or fuel carriers on the one hand, and as driving or propelling means on the other hand. Thus, no additional propelling devices are necessary to bring about circulation of heat carrier, i.e. of hot gases, in the closed-circuit pipe line.

The gases discharged from the resonant burner are introduced into the pipe line at an angle of less than ninety degrees to the pipe axis and, as above mentioned, at least a portion of spent gases advancing from the discharge end of the exhaust pipe is returned to said discharge end. It is preferred to introduce gases from the resonant burner into the pipe line coaxially with that pipe section which surrounds the discharge end of the burner's exhaust pipe.

According to another feature of the invention, a major part of, or preferably the entire, resonant burner is permanently or detachably built into the pipe line so that the burner is surrounded by a tubular or annular space constituting a passage for the spent gases flowing back to the discharge end of the exhaust pipe. In this manner, the spent gases are again heated due to their contact with the resonant burner, and the latter is simultaneously cooled due to its contact with the spent gases.

The invention also provides means for withdrawing gas from the pipe line, preferably at a location remote from the resonant burner.

Further, as the operation of the device ordinarily causes considerable noise, sound damping means or means which damp the pulsations of the gas current prior to withdrawal are preferably provided.

According to a preferred embodiment, the resonant burner forms a portable unit which is detachably mounted to the pipe line by quick coupling means which permit easy and quick attachment and removal, respectively.

The invention finds particular application for use in motor vehicles such as trucks and passenger cars which contain structures which tend to become ineffective at subzero temperature conditions. Thus, for example, it is known that trucks and the like motor vehicles are difficult to start during cold weather as, for example, the capacity of the battery is decreased by cold and the water system of the vehicle tends to freeze. According to the invention, a pipe line is provided which is permanently lodged within the motor vehicle adjacent such structures which tend to be affected by cold weather. Means are provided at the pipe line for attaching a resonant burner which is capable of generating a pulsating hot gas current throughout the pipe line. In this manner, those structures of the vehicle which tend to become ineffective during sub-zero temperature conditions are quickly brought to a higher temperature at which these structures again are operative. The pipe line may also extend through the driver and/or passenger or freight compartment. According to a preferred embodiment of the invention, the resonant burner is removably mounted at the pipe line so that the same burner can be used for several vehicles one after the other.

The novel features which are considered as characteristic of the invention are set forth in particular in the appended claims. The invention itself, however, both as to its construction and its method of operation, together with additional objects and advantages thereof, will be best understood from the following description of several specific embodiments when read in connection with the accompanying drawings, in which:

Figure 1:
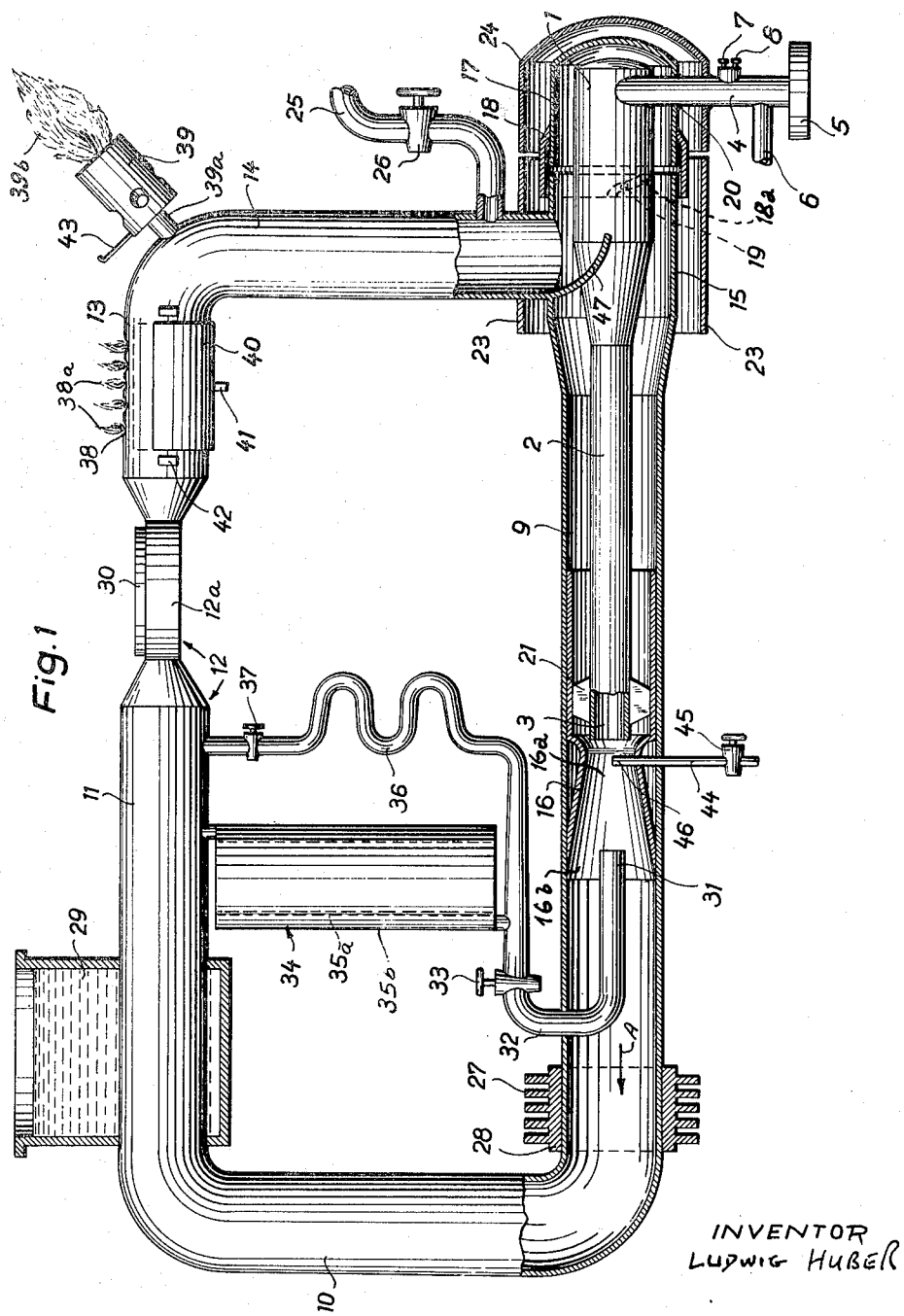
FIG. 1 is a partly sectional and partly elevational view of one embodiment of the novel apparatus.

Referring now in greater detail to the drawings, and first to FIG. 1, the apparatus therein shown comprise a cylindrical combustion chamber or firebox 1 connected with an exhaust pipe 2, the latter having an open discharge end 3. That end of combustion chamber 1 which is distant from the pipe 2 in connected with a tangentially disposed mixing tube or burner pipe 4 which latter is provided with an air inlet valve 5, communicates with a fuel supply conduit 6, and carries an ignition system whose terminals 7, 8 may be connected to a suitable source of electrical energy, not shown.

Elements 1, 2 constitute the so-called resonant or vibrating burner, and are installed in a closed-circuit pipe line consisting of main tubular sections 9 to 15 and constituting a closed-circuit path for the hot gas current. Section 9 is coaxial with and surrounds the pipe 2 so that the hot gases periodically expelled at great speed from exhaust pipe 2 set or maintain in motion hot gases already filling the closed-circuit pipe line 9–15 to thus bring about a hot gas current in a closed path defined by the sections of said pipe line. In order to avoid any damages to tube 9 at the exit or discharge end 3 of exhaust pipe 2, such as may be caused by high temperatures or by shock, member 9 coaxially receives a protective or shield pipe 16 which, in FIG. 1, assumes the form of a so-called Laval nozzle and whose smallest diameter zone 16a is immediately adjacent to discharge end 3. As is known, the important characteristic of this Laval nozzle or tube is in that it, adjacent to the smallest diameter zone 16a, tapers outwardly, as at 16b, and that the gases passing through the narrow passage into the outwardly tapering zone can reach speeds higher than the speed of sound.

Section 15 of the closed-circuit pipe line, which is connected with the right-hand end of member 9 and surrounds a portion of combustion chamber 1, is closed by a cap-shaped element 17 which surrounds the remaining portion of chamber 1. The diameter of cap 17 preferably equals that of tubular section 15, member 17 being provided with a collar 18 defining a suitable open slot 18a for reception of a pin 19 in bayonet lock fashion, pin 19 being fixed to the periphery of section 15. By welding the mixing tube 4 to cap 17, as is indicated at 20, combustion chamber 1 is simultaneously brought into proper position within members 15, 17, the exhaust pipe 2 being supported and held in desired position in protecting element or shield tube 16 by means of a number of brackets or spacing elements 21. The bayonet lock as described and illustrated thus constitutes quick coupling means for releasably securing the resonant burner to the pipe line.

The hot zone of the system, i.e. the zone of section 15 occupied by combustion chamber 1, can be surrounded by an additional tubular element 23 which is welded to pipe section 14 and whose open right-hand end is connectable with a closing element or cap 24. The latter, too, may be welded or otherwise secured to mixing tube 4.

As the burner 1, 2 periodically delivers streams of a hot gaseous medium into the closed-circuit pipe line 9–15, means must be provided to release superfluous or spent gases from the system. To that end, there is installed a spent- or waste-gas conduit 25 communicating with tubular section 14 and controllable by a valve element 26. When, as in the embodiment of FIG. 1, spent gas line 25 is closely adjacent to that terminal of section 14 which communicates with burner-surrounding section 15, the temperature of spent gases escaping through line 25 has reached its lowermost point due to heat exchange with surrounding elements as the hot gas current passes through sections 9–14 in that order. When, however, as will be explained hereinafter, spent gases are removed at a point immediately adjacent to discharge end 3 of exhaust pipe 2, the temperature of removed gases has reached its highest point. This last-mentioned method is preferred if the closed-circuit pipe line 9–15 consumes relatively little heat energy and if a heat consuming device is connected with the spent gas conduit.

The system may also preferably include sound damping means or means for damping the pulsations of the gases before they are withdrawn from the system. In this manner, noise is significantly reduced. Such sound damping means are illustrated and described in connection with the embodiment of FIG. 8.

The hot exhaust gases passing through the discharge end 3 of exhaust pipe 2 mix with moving spent gases in section 9 and advance together with such spent gases in a direction to the left, as indicated by arrow A. A heating device or radiator 28 provided with ribs 27 and shown in surrounding relationship about section 9 may be utilized, for example, as a heater for living quarters, for a tent-like structure, for an automotive vehicle or the like. Section 10 leads the advancing gaseous medium into the next adjacent section 11 passing through a receptacle or container 29 for a liquid substance which latter is thus heated by the circulating hot gases. The liquid substance may be water, a lubricating oil in an engine which can be heated to a desired working temperature, a carburizing agent or the like.

A part 12a of section 12 is reduced in height and increased in width to form a platform-shaped structure supporting an element 30 which represents a hot plate.

It is often desirable to branch off gases from the closed-circuit pipe line by providing one or more branch lines. For example, when fuel is constantly delivered through conduit 6 and combusted in chamber 1, the amount of heat energy transmitted to heating element 28 and liquid container 29 may be reduced by the provision of a branch line which spans the closed circuit pipe line by extending from section 9 in advance of element 28 to section 11 behind the container 29. In the embodiment of FIG. 1, the intake end 31 of such a branch line 32 is slightly spaced from the discharge end 3 of exhaust pipe 2 so that the branch line 32 receives very hot gases from member 2. A valve 33 is provided to partially or completely close the passage of gases through line 32. When the branch line is open, gases passing therethrough may heat a radiator 34 which is shown as consisting of an inner mantle 35a and an outer mantle 35b, or a portion 36 of the branch line itself may be of wavy or undulate shape to constitute a heating device, for example, a radiator for living quarters, and is then provided with a control valve 37.

FIG. 1 further illustrates an arrangement which constitutes a cooking oven with one or more flames. To that end, section 13 is formed with apertures 38 and carries a Bunsen burner 39. Apertures 38 may be closed by a slightly-less-than-cylindrical sleeve or mantle 40 which is rotatable about section 13 and is guided between spaced projections 42. Mantle 40 carries a hand grip member 41. A pusher 43 is provided to seal off the burner 39 from section 13, when desired. When the apertures 38 and the passage 39a leading to burner 39 are open, valve 26 in spent gas conduit 25 may be closed because said apertures and passage provide an escape route for excess gases from the closed-circuit pipe line. The necessary fuel for the flames 38a and 39b can be introduced directly into the hot gas current circulating in pipe line 9–15 in that the supply conduit 6 delivers into combustion chamber 1 more fuel than can actually be burned with the amounts of air entering through valve 5, i.e. the mixture in combustion chamber 1 is too rich or oversaturated. In addition to or instead of such oversaturated mixture in chamber 1, additional fuel may be introduced through a second supply conduit 44, provided with a control valve 45. The discharge end 46 of conduit 44 is preferably located directly in front of discharge end 3 of exhaust pipe 2, i.e. in the narrow zone 16a of Laval nozzle 16. As an alternative, the discharge end 46 of fuel supply conduit 44 may extend directly into the exhaust pipe 2 preferably close to the latter's discharge end 3. The fuel which may be in gaseous, liquid or pulverulent form, is finely divided in the circulating gaseous medium to be conveyed to apertures 28 and/or into the burner 39. The fine distribution of fuel is due, on the one hand, to relatively high temperature of advancing gases and, on the other hand, to the vibrating movements of gases at the point where additional fuel is introduced therein.

Figure 3:
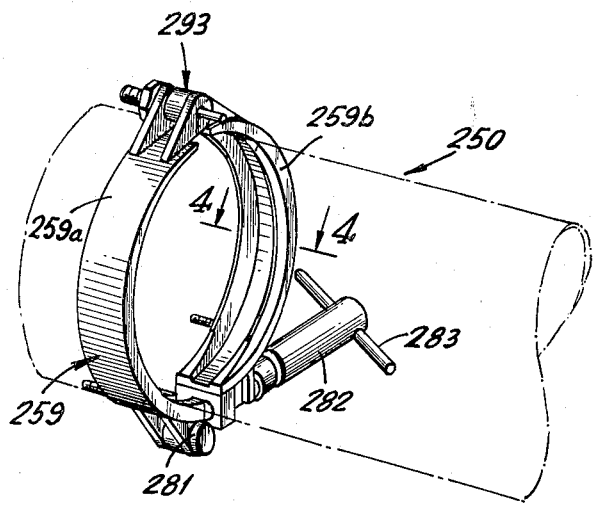
FIG. 3 is a perspective view of the quick coupling means for selectively connecting the resonant burner to or removing the resonant burner from the pipe line extending within the motor vehicle.
Figure 4:
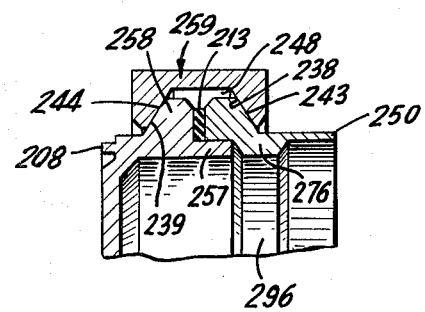
FIG. 4 is a section along line 4—4 of FIG. 3.

The gaseous medium returning through line 14 is directed toward the closed end of cap 17 by a deflecting member or flow regulating shield 47 so that the full length of entire combustion chamber 1 is surrounded by flowing gases. The latter cause a certain cooling of member 1 and are heated while passing therearound. As the assembly of parts 1, 2, 4–8, 17 and 24 is releasably connected with and thus separable from the closed-circuit pipe line 9–15, due to the provision of bayonet lock 18, 18a, 19, the resonant burner 1, 2 may be utilized in connection with different types of heat exchangers or pipe lines. Thus, the same burner may be utilized for a series of subsequently operable closed-circuit pipe lines, each of which is provided with a bayonet lock system or an equivalent quickly operable locking and unlocking means. Thus, the quick coupling means as shown in FIGS. 3 and 4 may be employed.

It will be noted in FIG. 1 that the gas streams discharged at the open end 3 of exhaust pipe 2 are coaxial with the gas column filling the tubular section 9. It is also possible to maintain the hot gas current in motion by introducing additional gases therein at a certain angle which, however, should not exceed 90 degrees.

Figure 2:
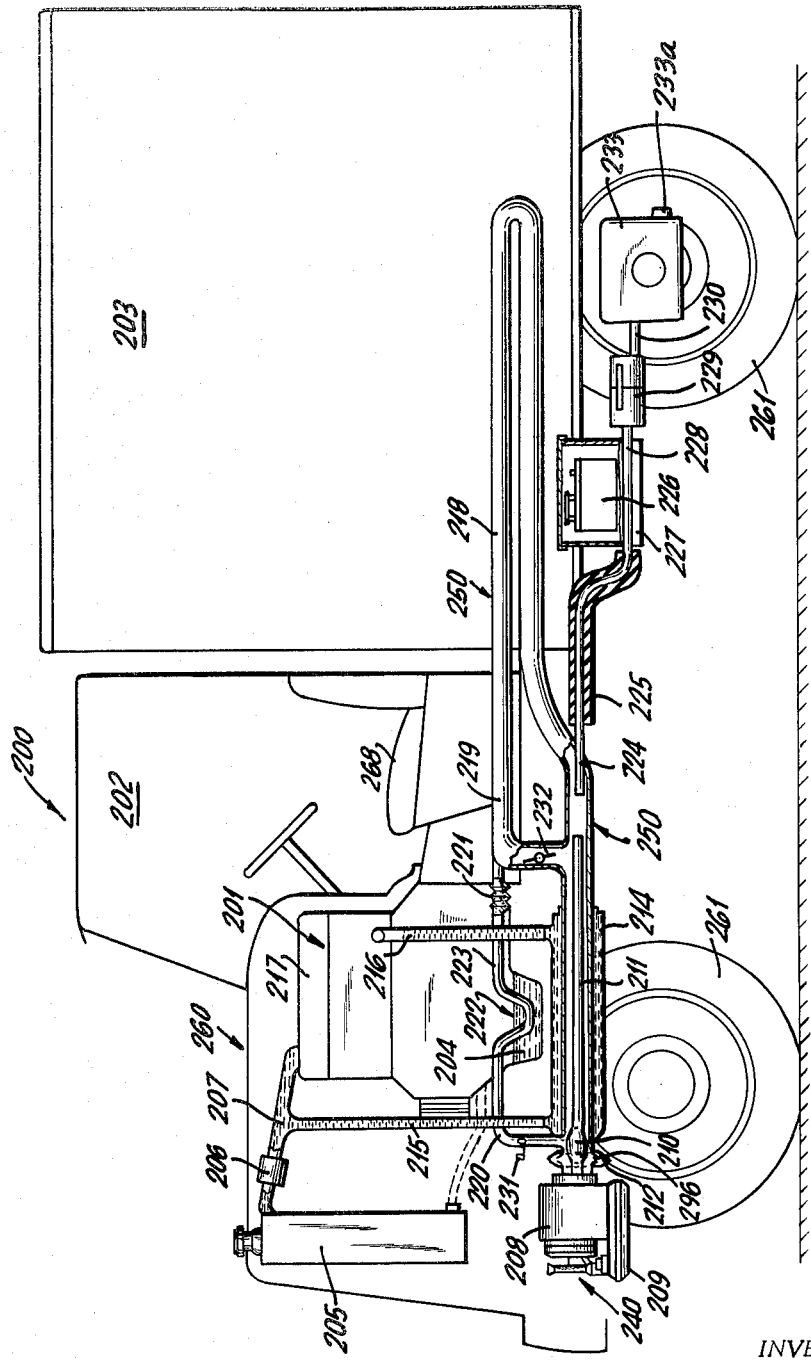
FIG. 2 is a somewhat diagrammatic representation of a further embodiment of the inventive apparatus in conjunction with a motor vehicle for heating selected elements of the operating mechanism of the motor vehicle during sub-zero emperature conditions.

Referring now to the embodiment of FIG. 2, it will be noted that reference numeral 200 generally indicates a motor vehicle such as a truck or lorry. The truck is diagrammatically shown and comprises the cab 202, the freight compartment 203, the hood portion 260, and the wheels 261. The water cooled combustion engine of the truck is generally indicated by reference numeral 201. The cooling system of the truck includes the radiator 205, the thermostat 206, the water conduits 207, 215, 216 and the water jacket 214. The cylinder block of the engine is indicated by reference numeral 217 while the oil-containing crank case of the truck bears reference numeral 204. The oil level in the crank case is seen at numeral 222. The truck also comprises a battery 226 which is mounted in the battery casing 227.

In accordance with this invention, a pipe line generally indicated by reference numeral 250 is mounted within and extends through the truck structure for the purpose of heating those elements of the truck which tend to become ineffective during sub-zero temperature conditions, for example, the water circulating system, the oil in the crank case 204 and the battery 226. Moreover, the line 250 extending through the truck is also intended to heat the cab 202 and the freight compartment 203. To this end, the pipe line 250 includes a section 218 which extends within the freight compartment, the section 219 provided within the cab and below the driver's seat 268, the conduit sections 220, 223 which extend adjacent and above the oil in the crank case and the conduit section 228 below the battery.

The line 250 has an inlet opening 296 through which is inserted the combustion chamber 210 and the exhaust pipe 211 of a resonant burner generally indicated by reference numeral 240. The resonant burner 240 forms an integral portable unit and comprises the casing portion 208 in addition to the combustion chamber 210 and 211. The fuel supply for the resonant burner is contained in the tank 209. The combustion chamber of the resonant burner is indicated at reference numeral 210. The construction of the resonant burner corresponds to that shown in FIG. 1.

The resonant burner is detachably connected to the inlet 296 of the pipe line as diagrammatically seen at 212 in a manner to be explained in detail later on. Conduit section 223 is connected to conduit section 219 by means of an elastic intermediate member or coupling 221, while reference numeral 232 indicates a shut-off valve within the pipe line 250. A similar shut-off valve is seen at 231 within the conduit section extending adjacent the crank case 204. The pipe line is also fitted with means for withdrawing gas therefrom. These means consist of the withdrawal line 224 communicating with pipe line 250. Withdrawal line 224 passes through insulation 225 and then below the battery 226 and into a muffler or sound dampener 229. The muffler 229 is in turn connected through pipe section 230 with an additional sound dampener in the form of a pot-shaped member which, at the same time, may serve to heat the differential of the truck. The gases exit from the pot 233 through the exhaust 233a.

The operation of the arrangement is as follows: Under normal operating conditions, the resonant burner will be disconnected from the pipe line which is permanently lodged within the truck structure. During sub-zero temperature conditions, however, the resonant burner is connected to the pipe line by means of the quick coupling means to be described hereinbelow and is started up. The resonant burner generates a pulsating hot gas current which enters the pipe line 250 through exhaust pipe 211 and flows throughout the pipe line as indicated by the arrows. The gases exit through the exhaust 233a as indicated. In this manner, all the operative elements of the truck mechanism which tend to become ineffective during cold weather are quickly heated by heat exchange between the pipe line and the respective element so that the engine of the truck can be started even under extremely cold weather conditions. Thus, the battery, the differential, the oil and the water system will be brought to temperatures sufficiently high to enable starting of the engine. In addition, since the pipe line extends through the cab and into the freight compartment, the driver will immediately find a pleasant atmosphere in the cab and goods to be loaded into the freight compartment will not be damaged by cold. In the event that the flow of the gas current is to be restricted to particular sections of the pipe line, the shut-off valve 232 and/or 231 may be actuated. Thus, for example, by shutting off valve 231 and opening valve 232, flow through the conduit section passing through the crank case will be prevented. The heating of the cab or truck compartment sections may also be shut off. Of course, any number of regulating valves may be provided at strategic positions. After the truck elements have been heated, which normally will take only a matter of minutes, the resonant burner is disconnected from the pipe line and may thereafter be used for heating a different truck or the like vehicle. The provision of quick coupling means, therefore, significantly facilitates the mounting and removal of the resonant burner. An embodiment for the construction of such quick coupling means is seen in FIGS. 3 and 4. The opening or inlet portion 296 of the pipe line 250 forms a bead or flange-shaped portion 276, while the resonant burner casing forms a complementarily shaped flange or connecting portion 258. The flange portion 258 also includes a protruding bearing or contact portion 257 on which rests the inner face of flange portion 276. A washer or gasket 213b is interposed between the juxtaposed surfaces of the respective flange portion. A clamping ring or collar generally indicated by reference numeral 259 defines a wedge-shaped cutout 248 which forms lateral contact surfaces 244 and 243 which are capable of engagement with complementary surfaces 239 and 238 of the flange portions of the resonant burner and the pipe line inlet portion, respectively. The ring or collar 259 consists of two essentially semi-circular parts 259a and 259b which are pivoted to each other by a pin-bracket arrangement as generally indicated at 293. When the resonant burner is to be connected to the pipe line, the collar 259 is placed over the flange portions 258, 276 and the two collar or ring portions are clamped together. In the embodiment shown, this is accomplished by a screw 281 on collar portion 259a which has an outer thread and is screwed into the inwardly threaded hollow sleeve member 282 on the collar portion 259b. Sleeve member 282 has an actuating handle 283. Due to the provision of the sealing washer 213b between the flange portions, a sealing connection is obtained. Of course, any suitable means may be used for urging the two ring halves toward each other. By using a quick coupling means as shown in FIGS. 3 and 4, the resonant burner may be readily connected to the pipe line which is permanently fixed within the motor vehicle.

In all the prior art constructions, wherein an ordinary burner generates the hot air current, the propelling of the current within the line has to be assisted by extraneous means, as the gas flow produced is not sufficient to maintain the desired flow velocity within the line. By providing a resonant burner, as in the present invention, in such a manner that both the flow energy and the resonant or oscillation energy of the compressed gases formed during each explosion are utilized to move the gas current in the pipe line, the flow velocity within the pipe line is considerably increased and has a pulsating characteristic which gives considerably improved result. In fact, it is a most essential and primary feature of this invention, that the explosion gases emanating from the resonant burner impart to the moving gas current within the pipe line both their flow energy and their resonant or oscillating energy. This phenomenon may be expressed in different language; the kinetic energy produced by the resonant burner has two components, that is, the flow energy and the resonant energy, both of which are transferred to the hot gas current in the pipe line. In addition, of course, the thermic energy of the hot compressed gases is also transferred to the moving gas current. In the prior art constructions, employing ordinary burners, only one type of kinetic energy, i.e. the flow energy, is present, as the burner operates continuously.

In the prior art constructions wherein an ordinary, continuously operating burner is provided, the transfer of the thermic energy is accomplished by simple mixing of the freshly entering hot gases with the previous gases, i.e. the hot gas current in the line. In the present invention, however, this heat transfer between the fresh and the previous gases occurs primarily by heat exchange. To take a practical example, it may be assumed that the gas current in the pipe line returns to the area where the resonant burner is located with a temperature of approximately 300° C. The temperature of the compressed gases at the moment of discharge through the exhaust pipe of the resonant burner is approximately 500° C. However, tests have shown that the temperature of the combustion chamber wall and of the adjoining portion of the exhaust is between 800 to 1000° C. This in turn means that the hot gas current within the pipe line, at the time when it reaches the discharge end of the exhaust pipe, by way of heat exchange with the burner walls has already reached a temperature which is but insignificantly increased by the admixture of the new hot gases entering from the exhaust pipe. The fact that the walls of the combustion chamber and of the exhaust pipe are so strongly heated is due to the resonant pulsating of the gas current because the pulsating gas streams prevent the formation of a cool boundary layer adjacent to the wall of the pipe line. Further, in view of the fact that the pulsating movement occurs within the entire pipe line, the heat transfer values within the pipe lines are entirely different than those obtained by employment of a continuously uniformly operating burner.

While specific embodiments of the invention have been shown and described in detail to illustrate the application of the inventive principles, it will be understood that the invention may be embodied otherwise without departing from such principles.

What is claimed is:

1. In combination: a motor vehicle having at least two spaced structures, such as a battery, an oil supply system or a water cooling system, which tend to become ineffective at sub-zero temperature conditions, a pipe line stationarily mounted within said motor vehicle and extending in heat exchange relation to said structures, said pipe line having an inlet opening, a resonant burner including a combustion chamber and a discharge pipe communicating with said combustion chamber, quick coupling means for detachably mounting said resonant burner on said pipe line with said exhaust pipe extending through said opening and within and surrounded with clearance by said pipe line, said resonant burner being capable of generating a pulsating hot gas current throughout said pipe line, gas withdrawal means connected to said pipe line at a location remote from said resonant burner for withdrawing gas from said pipe line and sound damping means connected to said gas withdrawal means.

2. In combination: a motor vehicle having at least two spaced structures which tend to become ineffective at sub-zero temperature conditions, a pipe line extending within said vehicle in heat exchange relation to said structures, a resonant burner including a combustion chamber and an exhaust pipe, said pipe line having an inlet portion having an opening and forming a first flange portion, said resonant burner having a casing including a second flange portion, quick coupling means for clamping said first and second flange portions together with said combustion chamber and said exhaust pipe extending into said pipe line with clearance, means for injecting a combustible mixture essentially consisting of air and a liquid fuel into said combustion chamber, means for igniting said combustible mixture within said combustion chamber, means for withdrawing gas from said pipe line at a location remote from said injection means, said resonant burner being capable of generating a pulsating hot gas current throughout said pipe line, and means connected to said gas withdrawal means for damping the pulsations of said gas current, said resonant burner operating in such a manner that upon ignition of the combustible mixture hot compressed combustion gases are produced in said combustion chamber which enter said pipe line through said exhaust pipe to expand in said pipe line thereby to create subatmospheric conditions, whereby a portion of the gases is returned into said exhaust pipe and a fresh amount of combustible mixture is sucked through said injecting means into said combustion chamber for ignition by said igniting means so that a repetitive combustion cycle corresponding to the resonant frequency of the resonant burner is established, the combined flow and resonant energy of the hot gases intermittently entering said pipe line maintaining a pulsating hot gas current in said pipe line to heat said structures and the gases flowing through said pipe line being cooled during their travel and again being reheated by heat exchange contact with the walls of said combustion chamber, a portion of the cooled combustion gases being withdrawn from said pipe line through said gas withdrawal means, the pulsations of said portion being damped prior to leaving said withdrawal means.

References Cited by the Examiner
UNITED STATES PATENTS

| | | | |
|---|---|---|---|
| 1,244,863 | 10/1917 | Kemp et al. | 126—91 |
| 2,200,731 | 5/1940 | Woodson. | |
| 2,211,831 | 8/1940 | Kuehn | 123—142.5 |
| 2,707,515 | 5/1955 | Lafferentz et al. | 158—4 |
| 2,770,226 | 11/1956 | Tenney | 123—142.5 |
| 2,823,659 | 2/1958 | Fallon. | |

OTHER REFERENCES

German printed application No. 1,089,948, September 1960.

JAMES W. WESTHAVER, *Primary Examiner.*